United States Patent [19]

Shaw

[11] 4,168,591

[45] Sep. 25, 1979

[54] INSECT ATTRACTOR

[76] Inventor: Christopher Shaw, c/o Krown, Hovevei Zion 16, Jerusalem, Israel

[21] Appl. No.: 815,181

[22] Filed: Jul. 13, 1977

[51] Int. Cl.² .......................... A01M 1/14; A01M 1/02
[52] U.S. Cl. ........................................ 43/114; 43/118; 43/124
[58] Field of Search ................. 43/107, 112, 113, 114, 43/118, 124

[56] References Cited

U.S. PATENT DOCUMENTS

| | | | |
|---|---|---|---|
| 1,996,293 | 4/1935 | Honse | 43/107 |
| 2,122,487 | 7/1938 | Pastor | 43/113 |
| 3,023,539 | 3/1962 | Emerson, Jr. | 43/114 |
| 3,863,384 | 2/1975 | Weatherston et al. | 43/114 |
| 4,086,720 | 6/1978 | Wiser | 43/113 |

OTHER PUBLICATIONS

Wright, "Why Mosquito Repellents Repel", *Scientific American*, vol. 233, pp. 104–111 (7/75).

*Primary Examiner*—William Pieprz
*Attorney, Agent, or Firm*—Gottlieb, Rackman & Reisman

[57] ABSTRACT

An apparatus and method for attracting and killing mosquitos and other similar insects are disclosed. The device includes a body, within which is disposed heat generating means, and a surrounding porous sleeve which contains a charge of water and which carries a sticky substance on its outer surface. Upon activation of the unit, both heat and moisture are radiated to the surrounding environment, and the mosquitos and other insects which are thereby attracted to the device will adhere to the sticky substance and eventually be destroyed.

3 Claims, 5 Drawing Figures

INSECT ATTRACTOR

This invention relates generally to insect traps, and more specifically, to an improved insect attractor for mosquitos and other similar insects.

Insects such as mosquitos have been both an annoyance and a health hazard to human beings for thousands of years. In some parts of the world, different species of mosquitos act as carriers for various diseases, such as malaria, which are dangerous to human health or even fatal. In addition, mosquito bites are well-known phenomena which cause itching, swelling and physical discomfort. Moreover, the "buzzing" of mosquitos contributes greatly to the annoyance caused by these insects. Similar annoying and dangerous characteristics are attributable to a vast number of other similar biting insects, such as horse flies, black flies, midges and biting gnats.

Various attempts have been made in the prior art to provide insect traps which are effective against mosquitos and similar insects. In areas of high mosquito density, screens or nets as well as strong toxic insecticides are required in order to combat these insects. However, neither of these methods is completely effective against large numbers of mosquitos, always leaving small numbers of mosquitos alive to constitute the annoyance factor.

Other prior art devices intended for use against mosquitos and similar insects generally use light to attract the insects to the vicinity of the device, where it is contemplated that they will eventually contact a sticky substance and be caught. Examples of such devices can be found in U.S. Pat. Nos. 449,138, 1,182,389 and 1,723,919.

However, these prior art devices are unsatisfactory in that they utilize only visual stimuli to attract the insects for eventual entrapment. While certain insects, such as moths, are attracted by bright light, it has been shown that visual stimuli play no significant role in a mosquito's search for prey. Rather, research has revealed that the two basic sensory systems which blood-sucking mosquitos of the family Culicidae use when searching for their prey involve the detection of heat and moisture, respectively. The specific genera of Culicidae which have been studied in this regard include Culex (the common house mosquito), Anopheles (the "malaria mosquito") and Aedes (the "yellow fever mosquito"). See, generally, Wright, R. H. "Why Mosquito Repellents Repel", *Scientific American*, Vol. 233 (July, 1975), pp. 104–111; Daykin, P. N., Kellogg, F. E., and Wright, R. H. "Host Finding and Repulsion of *Aedes Aegypti*", *Canadian Entomologist*, Vol. 97 (1965), p. 239; and Kellogg, F. E. "Water Vapor and Carbon Dioxide Receptors in *Aedes Aegypti*", *Journal of Insect Physiology*, Vol. 16 (1970), p. 99.

While various objects such as lamps radiate heat, and others give off moisture, only living creatures radiate both heat and moisture, and only human beings emit heat and moisture in a mosquito's optimal sensory range. Therefore, a mosquito will almost always select a human being for its prey, even though there are other animate or inanimate objects nearby which are also radiating heat and/or moisture. The prior art devices mentioned above are ineffective in attracting and trapping the insects because they only emit light. Although these devices also emit heat as a by-product, none of them emits moisture, and the prior art has failed to provide a device for insect control which emits both heat and moisture in amounts comparable to that emitted by the human body.

It is therefore the principal object of this invention to provide an insect attractor which is particularly effective in attracting and destroying mosquitos and similar insects.

Another object of this invention is to provide an insect attractor which emits both heat and moisture in the same range as that of a human body in order to divert a mosquito from a human subject in its search for prey.

It is a further object of this invention to provide an insect attractor which is effective but which utilizes no toxic insecticides which may be dangerous to human health.

Still a further object of this invention is to provide an insect attractor which is effective against insects while being aesthetically pleasing.

Briefly, in accordance with the principles of this invention, an insect attractor is provided with heat generating means disposed within the body of the device. The heat generating means preferably comprises a heating coil which is powered by conventional house current. The device further comprises moisture generating means which, in the preferred embodiment, includes a hollow plastic sleeve which is filled with water and which surrounds the body of the device. The sleeve is composed of a porous material, and is replaceable. Also included in the device is an insect retaining means, desirably taking the form of a sticky substance which is applied to the outer surface of the sleeve.

In operation, the body of the device is heated by the heating coil, causing heat to pass by radiation to the surrounding environment. Simultaneously, the passage of heat through the sleeve causes the water therein to tend to evaporate through the porous material into the environment as well. Thus, the device becomes an effective source of heat and moisture emissions in any room, and mosquitos or other insect attracted to it are trapped on the sticky substance and eventually die.

It is therefore a feature of an embodiment of this invention that an insect attractor is provided with a heating coil and a replaceable plastic sleeve filled with water, thereby creating a source of warmth and moisture which is particularly effective in attracting mosquitos and other insects having similar sensory characteristics.

Another feature of an embodiment of this invention is that an insect attractor is provided with a disposable sleeve having a sticky substance on the outer surface thereof to which insects attracted to the device will adhere for eventual destruction.

Still another feature of a preferred embodiment of this invention is that an insect attractor is provided with louvres to increase its surface area and to more effectively spread the heat and moisture currents generated by the device over a wider area.

Further objects, features and advantages of this invention will become more readily apparent from an examination of the following specification, when taken in conjunction with the accompanying drawing, wherein.

Figure 1:
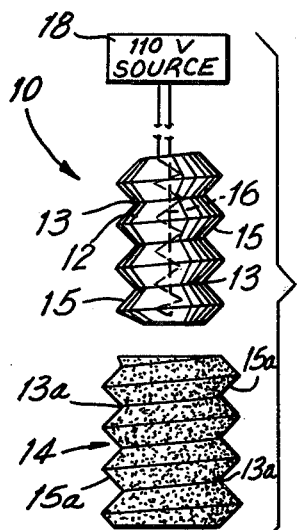
FIG. 1 is an exploded perspective and partially schematic view of an insect attractor constructed according to a preferred embodiment of this invention, showing the body of the device and its surrounding sleeve.
Figure 2:
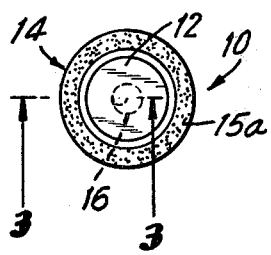
FIG. 2 is a top view of the device shown in FIG. 1.

Referring now to the drawing, and specifically to FIGS. 1 and 2, an insect attractor embodying the principles of the present invention is generally designated 10. In the preferred embodiment, insect attractor 10 comprises a glass or ceramic body 12 which is generally cylindrical in shape, but which has a continuous helical indentation or groove 13 formed on its outer surface, creating a series of baffles or louvres 15 thereon. Insect attractor 10 further includes heat generating means comprising a heating coil 16 embedded within body 12. Coil 16 is connected to and powered by a conventional 110-volt source of electrical current, shown schematically in FIG. 1 by block 18. In the preferred embodiment, heating coil 16 is connected to conventional house current.

The unit 10 is provided with moisture generating means, which includes a surrounding plastic sleeve designated by the numeral 14. As shown best in FIG. 1, sleeve 14 is shaped to conform to the contours of body 12, having a corresponding helical groove 13a and corresponding louvres 15a. The shape of sleeve 14 is therefore generally complementary to that of body 12, permitting sleeve 14 to be rotatably attached to body 12 in the conventional manner for a tight fit, as shown by arrow A.

Figure 3:
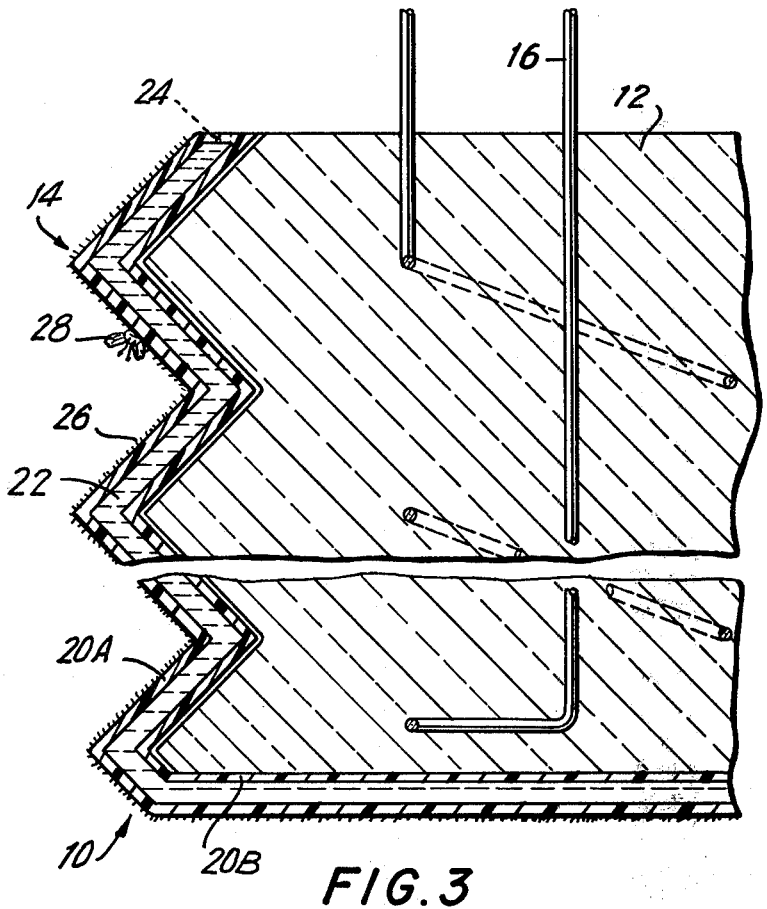
FIG. 3 is an enlarged partial cross-sectional view of the interior of the insect attractor, showing the body inserted within the sleeve, the view being taken along lines 3—3 of FIG. 2 in the direction of the arrows.

Referring now, in addition, to FIG. 3, sleeve 14 is a thin hollow membrane having an outer wall 20A and an inner wall 20B, the distance between walls 20A, 20B being preferably no more than one or two millimeters. Outer wall 20A is constructed of a type of plastic which is somewhat porous, permitting molecular migration therethrough, such as cellulose acetate, acrylate or methacrylate.

The aforesaid moisture generating means futher includes a supply of water 22 contained in sleeve 14 between walls 20, 22 (see FIG. 3). Sleeve 14 is initially provided with a plurality of apertures 24 through which water 22 may be introduced. This may be accomplished by submerging sleeve 14 into a water-filled vessel (not shown), and allowing sleeve 14 to fill with water, after which apertures 24 may be permanently sealed. Alternatively, water supply 22 may be injected into sleeve 14 with a syringe or by some other well-known form of pressure injection.

A sticky substance 26 is applied to the external surface of outer wall 20A. Sticky substance 26 may be of any conventional type, such as that commonly used on flypaper, or that suggested in U.S. Pat. No. 1,723,919, and may be distributed on the outer surface of wall 20A so as to minimize any interference with the release of water vapor through the porous plastic of the sleeve 14, as explained more fully hereinbelow.

Figure 4:
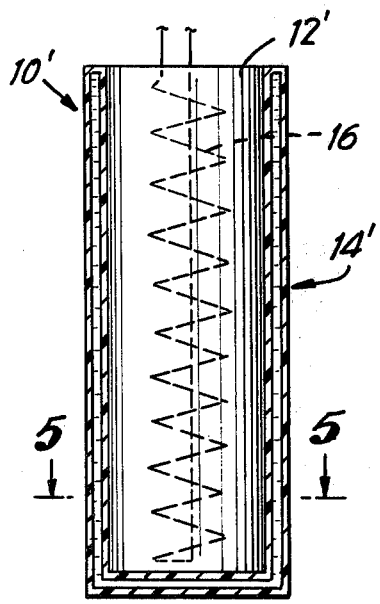
FIG. 4 is a side cross-sectional view of an alternative embodiment of this invention.
Figure 5:
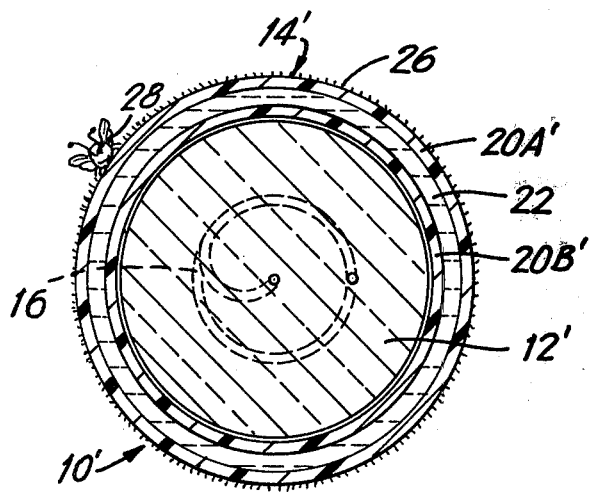
FIG. 5 is a top cross-sectional view taken along lines 5—5 of FIG. 4 in the direction of the arrows.

Considering FIGS. 4 and 5, insect attractor 10' may alternatively be constructed without grooves 13, 13a and without louvres 15, 15a, but may instead be substantially cylindrical in shape. In this embodiment, body 12' is a right circular cylinder shown in top cross-section in FIG. 5, while sleeve 14' is of a mating cylindrical configuration illustrated in side cross-section in FIG. 4. Sleeve 14' has an outer wall 20A' and an inner wall 20B', between which is contained a charge of water 22. The external surface of outer wall 20A' is also coated with a sticky substance 26, as shown in FIG. 5. Except for the shape of body 12' and sleeve 14', insect attractor 10' (as shown in FIGS. 4 and 5) is in all other respects generally identical to insect attractor 10 (as shown in FIGS. 1–3).

When the occupant of a room desires to use the device, body 12 may be inserted into a fresh sleeve 14 which has previously been filled with a supply of water 22. Heating coil 16 may then be connected to a source of current, causing it to radiate heat through body 12. The temperature of heating coil 16 is preferably maintained in the range of 98°–100° F., which is approximately normal internal human body temperature.

The heat radiated by coil 16 causes water supply 22 to evaporate gradually, the molecules of water vapor escaping through porous wall 20A of sleeve 14. Thus, both heat and moisture are radiated into the air surrounding insect attractor 10, with louvres 15 aiding in the distribution of the heat and moisture currents. This radiation will enable insect attractor 10 to rapidly become an effective local source of heat and moisture in the room, causing an illustrative mosquito 28 to be immediately attracted to it. Upon contacting outer wall 20A of sleeve 14, mosquito 28 will adhere to the sticky substance 26 coated thereon, and will eventually die when it is unable to escape from the wall.

It will be appreciated that sleeve 14 may be replaced whenever the water supply 22 therein is completely evaporated, or when there is an excessive accumulation of dead insects on outer wall 20A such that little insect-attracting surface remains or the wall becomes unsightly. However, body 12 may be used repeatedly as desired.

In addition, water supply 22 may be artificially colored, as desired, in order to improve the appearance of insect attractor 10, and also to serve as an indicator of the amount of water remaining in the sleeve. If colored water is used, the gradual escape of water 22 under the influence of the heat provided by coil 16 would cause the color of sleeve 14 to change, thereby indicating that replacement or refill of sleeve 14 was necessary.

It may be seen from the foregoing that the embodiments described herein are by way of illustration and not of limitation, and that various changes in and other modifications of the construction, composition and arrangements of parts are possible in light of the above teachings. For example the size, shape and color of the device may be varied in order to provide maximum attractiveness to people without impairing the effectiveness of the device. Accordingly, it is to be understood that other embodiments of this invention may be utilized without departing from the spirit and scope of the present invention, as set forth in the appended claims.

What I claim is:

1. An apparatus for attracting and killing insects comprising (a) a core, (b) heat generating means disposed within said core, said heat generating means comprising a heating coil embedded within said core and means for activating said heating coil, (c) moisture generating means substantially surrounding said core and cooperating with said heat generating means to attract the insects to said apparatus, said moisture generating means comprising a replaceable sleeve shaped for mating engagement with said core, and a charge of water contained within said sleeve, said sleeve having a porous surface for permitting gradual evaporation and release of said charge of water upon activation of said heat generating means, and (d) insect retaining means disposed on said moisture generating means for retention thereon of the insects attracted to said apparatus.

2. An apparatus in accordance with claim 1 wherein said insect retaining means comprises a sticky substance applied to the outer surface of said sleeve.

3. An apparatus in accordance with claim 2 wherein said body and said sleeve have louvres.

* * * * *